United States Patent [19]

Majkrzak

[11] Patent Number: 4,919,308
[45] Date of Patent: Apr. 24, 1990

[54] HOT MELT DISPENSER

[75] Inventor: Gerald A. Majkrzak, Minneapolis, Minn.

[73] Assignee: May Coating Technologies, Inc., St. Paul, Minn.

[21] Appl. No.: 351,326

[22] Filed: May 4, 1989

Related U.S. Application Data

[63] Continuation of Ser. No. 130,407, Dec. 9, 1987, abandoned.

[51] Int. Cl.$^5$ ................................................ B67D 5/62
[52] U.S. Cl. ............................ 222/146.5; 222/146.2; 219/421; 219/422; 126/343.5 A
[58] Field of Search ............... 222/146.2, 146.4, 146.5; 126/343.5 A, 343.5 R; 432/13, 210; 219/420–424

[56] References Cited

U.S. PATENT DOCUMENTS

| | | |
|---|---|---|
| 2,355,624 | 9/1944 | Burry. |
| 3,270,901 | 9/1966 | Ord .................................. 414/607 X |
| 3,877,359 | 4/1975 | Keating ........................... 219/422 X |
| 4,018,468 | 4/1977 | Lundquist ....................... 414/607 X |
| 4,024,854 | 5/1977 | Park et al. ..................... 126/343.5 A |
| 4,074,707 | 2/1978 | Perelman. |
| 4,262,825 | 4/1981 | Jacobson et al. ............. 222/146.2 X |
| 4,308,447 | 12/1981 | Notzold et al. ..................... 219/421 |
| 4,505,669 | 3/1985 | Rogers ............................ 219/420 X |
| 4,717,809 | 1/1988 | Schwizer ........................ 219/422 X |
| 4,724,983 | 2/1988 | Claassen ........................... 222/146.5 |

FOREIGN PATENT DOCUMENTS 684079  9/1979  U.S.S.R. ............................ 222/146.5

OTHER PUBLICATIONS (Advertisement) Meltex, Drum Unloaders "A".
(Advertisement) The New Dynamelt DM-55 Hot Melt Unloader/Dispenser, Graco LTI "B".
(Advertisement) Series 4, Johnstone Pumps, Johnstone Pump Company, Inc. "C".
(Advertisement) Meltex, Drum Melters "D".
(Advertisement) Hot Melt In Steel Or Fibre, LTI Corporation "E".
(Advertisement) Uni-FLow, Industrial Machine Manufacturing Co., Inc. "F".
(Advertisement) Fibre Drum Unloader, Industrial Machine Manufacturing Co "G".
(Advertisement) Series 5800 Programmable Bulk Melter System, Nordson "H".
(Advertisement) Model 5505 & Model 5510 Bulk Melter/Applicator Systems, Nordson "I".
(Advertisement) Bulk Melter/Applicator Changeover Manifold System, Nordson "J".
(Advertisement) Portable Hot Melt Unloader/Dispenser, Graco LTI "K".
(Advertisment) DM-55P Bulk Unloader/Dispenser System, LTI Corporation "L".

Primary Examiner—Joseph J. Rolla
Assistant Examiner—Boris Milef
Attorney, Agent, or Firm—Merchant, Gould Smith, Edell, Welter & Schmidt

[57] ABSTRACT

A hopper-type hot melt dispenser for use in liquifying and dispensing drum or pail quantities of slug form hot melt includes a hopper size to receive a drum or pail of slug form hot melt. Band heaters around the circumference of the hopper heat the walls of the container suspended in the hopper causing slug form hot melt contained therein to be released as a slug into the hopper. The method of use of the apparatus provides for supporting a container of slug form hot melt in the hopper and heating the container with the band heaters until the slug is released, whereupon the container is removed from the hopper leaving the slug deposited therein.

39 Claims, 3 Drawing Sheets

HOT MELT DISPENSER

This is a continuation, of application Ser. No. 130,407, filed Dec. 9, 1987 now abandoned.

TECHNICAL FIELD OF THE INVENTION

The present invention relates generally to hot melt technology and more particularly to apparatus for liquifying and dispensing hot melt.

BACKGROUND OF THE INVENTION

Meltable materials, commonly called hot melts, find increasing use in industry for instance as temporary or permanent fusion adhesives or for coating substrates. Hot melts may be used to coat substrates to provide, for instance, a gas impermeable surface thereof or, for instance, for the production of adhesive tapes, adhesive foils, for self-sealing labels. Hot melts are also commonly used for such purposes as cementing shoe and leather parts to each other, to glue cardboards to each other, to glue the back of the books to the remainder thereof, to glue parts of furniture to each other, as well as during other assembly and finishing operations.

The known hot melts are predominantly binary and tertiary mixtures of basic polymers, adhesive resins and waxes, softeners and fillers. Hot melts and adhesives are available in various piecemeal forms such as granulate, powder, slivers, pearls, strands, candles, and in bulk solid form such as blocks and slugs. These materials are prepared for use by liquifying them by heating in a liquifying apparatus and by pumping or otherwise conveying the liquified hot melt to an application head in application apparatus which applies the hot melt to the surfaces to be coated or adhesively joined.

There are two principal types of dispensing apparatus which are currently in use to liquify and dispense hot melt. A first type of apparatus, which can be termed a "hopper" dispenser, includes a hopper, a melter for liquifying hot melt deposited in the hopper, and a pump to pump the liquified material from the melter to the application head. This type of dispenser is typically used in low volume hot melt operations in which hot melt is fed to the melter in piecemeal type forms in quantities weighing twenty lbs. or less. These small quantities can be fed into the hopper simply by "pouring" the hot melt pieces from the container into the hopper.

The other type of dispensing apparatus is known as a drum unloader. A drum unloader liquifies and dispenses solid, unitary mass, slug form hot melt directly from a 55-gallon or (equivalent sized metric drum container) or from pail sized containers. A drum unloader generally comprises a hydraulically driven platen including a melting grid, a dispensing aperture in the platen and a pump to pump the hot melt from the aperture to the application. In operation, the platen is pressed into the open end of an upright drum or pail of hot melt and the hot melt is liquified by the melting grid and forced up and out of the dispensing aperture by the pressurizing force of the platen into the pump. Drum unloaders are typically used in larger volume operations due to the volume of hot melt needed in the operation and because hot melt is typically less expensive when purchased in solid slug form in drum quantities. In addition, certain hot melts are so viscious they cannot be pumped to the application without the aid of hydraulic pressure, and thus drum unloaders are uniquely qualified for dispensing hot melts of this type.

Drum unloaders do, however, suffer from several drawbacks. The most serious of these drawbacks is the rupturing of the drum containers during use, whereby extremely hot and dangerous hot melt is spewed from the ruptured drum. Such ruptures can occur either as the result of defects in the drum walls or as the result of equipment malfunction and/or operator error. In addition, drum unloaders tend to leave a measurable quantity of hot melt in the bottom of the drum which cannot be forced out by the platen due to unavoidable voids between the platen and the bottom of the drum. Extracting this residue from the drum is difficult and time consuming, and as such the residue is often discarded with the drum, resulting in undesirable losses. Drum unloaders also suffer from a problem called "burying the platen". This problem occurs when the seal between the platen and the side surface of the drum is broken so that hot melt flows up and over the platen, thus "burying" it in liquified hot melt. Extracting a buried platen from a hot melt drum is difficult, time consuming and often dangerous. Another drawback of a similar nature results from the need to remove the hot platen from the drum for changeover to a new drum or at the end of the workshift. Hot, liquified hot melt often drips from the platen when it is lifted out of the drum exposing workers to the risk of a serious burn and creating a difficult mess in any event. Drum unloaders also require that the application process be stopped to switch drums resulting in undesirable process down time. Moreover, certain types of hot melt are classified as hazardous materials. If an emptied drum contains a significant quantity of such hazardous materials as they usually do, its disposal requires special, more expensive procedures than required for disposal of unhazardous waste.

In view of the many drawbacks to drum unloaders others have recognized it would be beneficial to provide a hopper-type melter system that could accommodate drum or pail quantities of slug form hot melt. The economies of purchasing hot melt in drum quantities and slug form are thus achieved while the disadvantages of drum unloaders are avoided. However, unloading a slug of hot melt from a drum or pail is very difficult because the viscosity and stickiness of unheated hot melt makes it impossible to pour or slide out of the container.

At least two systems have been proposed to deal with the problem of unloading a container of slug form hot melt into a hopper. In U.S. Pat. No. 4,505,669 to Rogers there is disclosed a hopper-type melter which contemplates loading the entire hot melt drum, including the container, into the hopper. To melt the hot melt out of the drum container, the Roger's device includes heating elements which project upwardly from the bottom of the hopper so that they extend into the lower end of the drum container positioned in the dispenser and make contact with the hot melt material held therein. These projections melt the hot melt sufficiently to cause it to flow downwardly to the bottom of the melter where additional heating elements are provided to liquify it sufficiently to be pumped to the application heads. While Rogers also indicates that hot melt may be placed in the hopper without its drum container as a solid unitary mass, it does not suggest a way to get the hot melt out of the container and into the hopper.

The system of Rogers has several drawbacks. The main problem results from leaving the drum container in the unit while the hot melt is dispensed. If the hot melt melts out of the drum faster than it is pumped out and dispensed it backs up in the space between the outside of the drum and the hopper. Removing the drum from the hopper when it is empty thus becomes extremely difficult, particularly if hot melt cools and congeals in the space between the hopper and drum. Moreover, when the drum is removed its outside is coated with hot melt, making it difficult to handle. Furthermore, it is possible that the backed-up liquified hot melt could get contaminated with paint or other foreign substances from the outside surface of the drum container, possibly altering its adhesive characteristics. Moreover, unless the heating elements of the Roger's device can supply sufficient heat to the "top" end of a drum being unloaded it is possible that a quantity of hot melt will remain stuck in the top end of the drum and fail to be melted out and released to the "bottom" of the drum for liquification by the heating elements. As said above, however, applying too much heat with the heating elements can cause unwanted back-up of the hot melt.

Another approach to dispensing drum quantities of hot melt from hopper-type dispensers has been provided by the Meltex Corporation of Peachtree City, Ga. The Meltex approach utilizes a bulk hopper-type melter having a capacity sufficient to accommodate a 55-gallon (or equivalent metric size) drum of hot melt and a drum unloading device which tips up and lifts a drum over the melter for unloading. Once tipped up over the hopper the outside of the drum is radiated with infrared heaters mounted over the melter until the hot melt slug inside the drum releases from the container into the melter's hopper. To control the direction and rate of the slide of the slug into the hopper the Meltex unit includes a heated spike positioned across the diameter of the open end of the drum. The spike restrains the movement of the hot melt slug to the rate of melting of the spike through the slug. Thus, the Meltex system is somewhat elaborate in design and unwieldy to use. In addition, because the system involves suspending a large mass of semi-liquified hot melt from a considerable height it is inherently dangerous.

The present invention, like the Rogers and Meltex devices, provides a hopper-type dispenser for use in dispensing drum quantities of slug form hot melt. The invention is similar to the Meltex system in that it provides means for uloading the contents of a hot melt drum into the hopper of the dispenser, as opposed to the Rogers' system which contemplates leaving the container in the melter while dispensing its contents. The present invention is, however, simpler in construction than the Meltex system, can empty the contents of hot melt drum into the hopper in less time than the Meltex system, and assures that the entire hot melt slug is safely deposited in its entirety in the hopper without risk of spilling or splashing.

SUMMARY OF THE INVENTION

The present invention provides a hopper-type hot melt dispenser for use in liquifying and dispensing drum or pail quantities of slug form hot melt. As a result of its unique combination of features, the invention provides for the safe, efficient and substantially complete emptying of slug form hot melt from a container into the dispenser's melter. According to one aspect of the invention, there is provided a hopper supported in a housing, with a melter unit located at the bottom of the hopper for heating hot melt to a liquified condition. The hopper is sized to receive a drum of hot melt to be unloaded in the melter. The container is positioned to be unloaded in the hopper with the lower end open and the top end either open or otherwise vented. Auxiliary heating means for heating the container is provided to release the hot melt slug therefrom, after which the container can be removed from the hopper leaving the slug behind. There is further provided means for lifting the container into and out of the hopper and supporting the container to be emptied in the hopper while the auxiliary heat is applied. According to another aspect of the invention the auxiliary heating means comprises band heaters located about the circumference of the hopper.

DETAILED DESCRIPTION OF THE INVENTION

Figure 1:
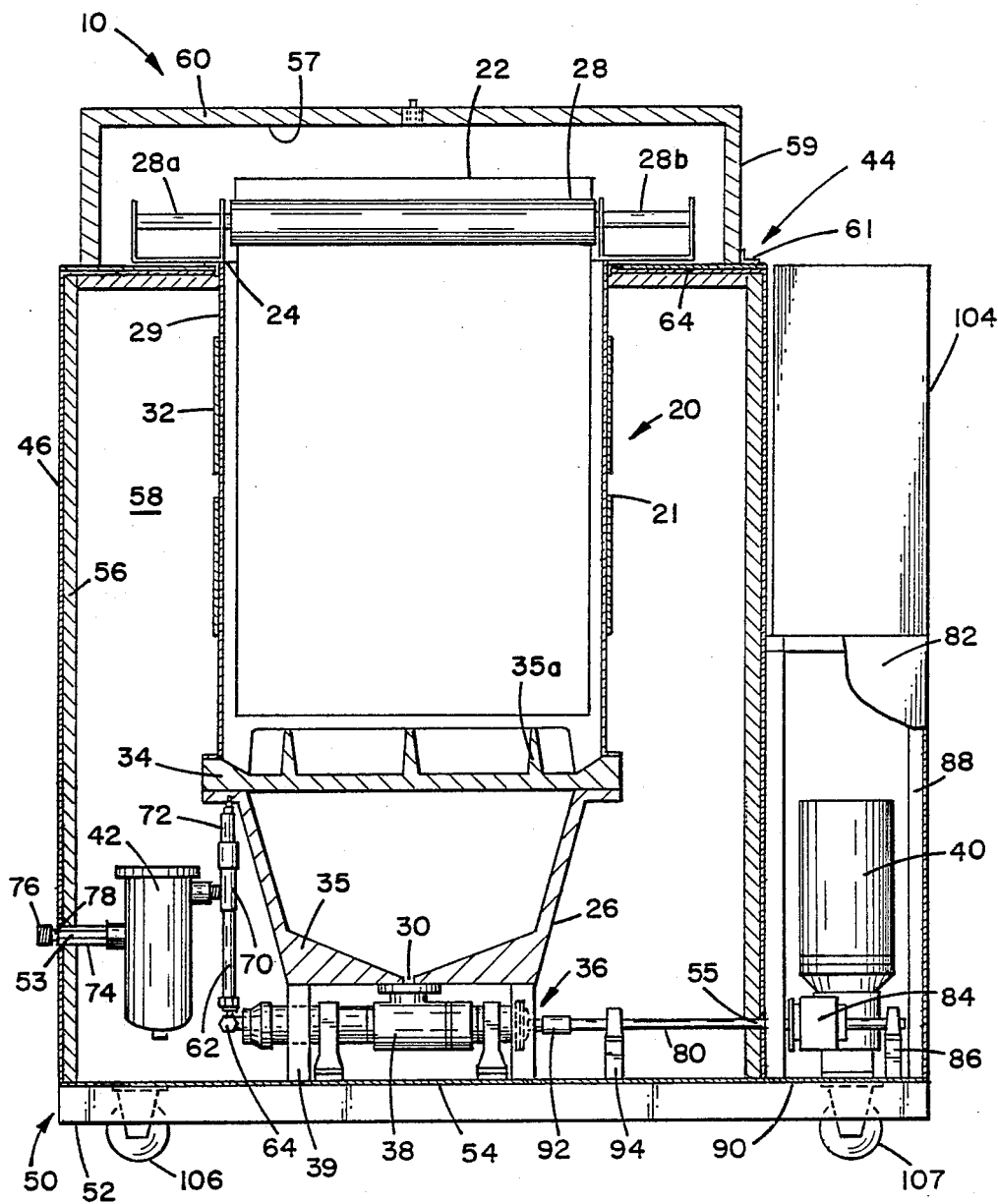
FIG. 1 is a cutaway side view of the hot melt dispenser according to the present invention.
Figure 2:
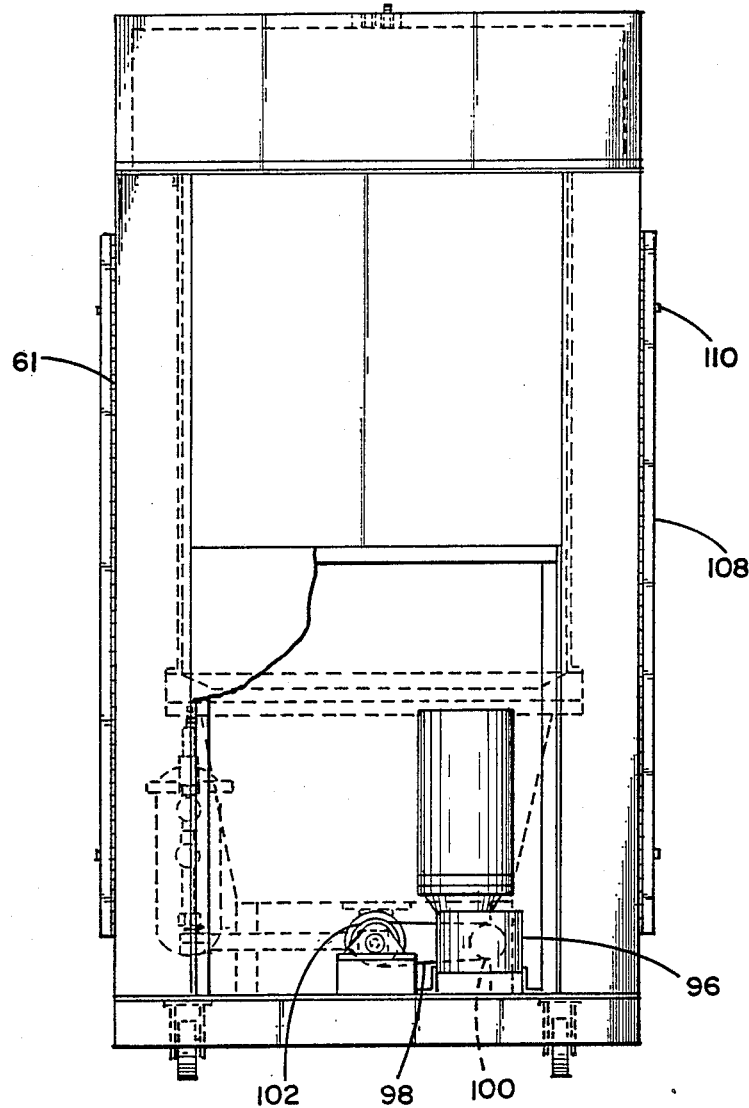
FIG. 2 is partially cutaway end view of the hot melt dispenser according to the present invention.

Referring now to FIGS. 1 and 2 of the drawing, there is shown a preferred embodiment of the hot melt dispenser 10 of the present invention. The dispenser housing 44 includes a shroud 46 disposed about substantially all of the housing's exterior surface, with the exception of the base 50. Base 50 includes a base frame 52 and a base plate 54 located on the interior surface thereof and two apertures 53 and 55 leading to the exterior of the housing. Insulation 56 is provided on the interior surface of the shroud 46. A melter 20 is supported inside housing 44 and includes a hopper 21 open at its upper end 24.

The hopper 21 is generally cylindrical in shape and is covered by a cylinder weldment 29. Below the hopper the melter 20 tapers down to an aperture 30 at its lower end 26, out of which liquified hot melt flows after heating. Band heaters 32 are disposed about the exterior circumferencial surface of the cylinder weldment 29. Cartridge heaters 34 are axially disposed in castings 35, which include a melting grid 35a of conventional design. Grid 35a provides liquifying heat to a hot melt mass resting thereon, whereafter it pools in the bottom of castings 35, which are heated sufficiently to maintain the liquified hot melt at the temperature required for pumping and use.

The dispenser housing 44 is covered by a hopper cover 60 having an inside surface 57 and an outside surface 59, and which is upwardly moveable by means of a continuous hinge 61 located on a line connecting the cover 60 with the housing 44. Cover 60 covers the hopper 20 as well as a large portion of the top of the housing 44. A shroud plate 64 covers that portion of the housing which would be exposed if the cover 60 were in upward (open) position.

A pump mechanism 36 is provided to pump hot melt from the melter 20 to a hot melt application device such as a nozzle. The pump mechanism 36 includes a pump 38 driven by a (type) motor 40 and a filter 42 for filtering the hot melt before it passes to the application device. The pump 38 is disposed beneath and connected to the aperture 30 in the melter 20, with the filter 42 and the motor 40 disposed on either side of the pump. Support legs 39 maintain the melter 20 in a position above the pump 38. Motor 40 is located outside the housing 44, while the pump and the filter are located inside the housing.

Filter 42 and pump 38 are connected by a first pipe 62 and a second pipe 63. The first pipe 62 extends in a substantially vertical position between the pump 38 and the filter 42 and is equipped with pipe fittings 64 and 70 and a safety relief valve 72. The pipe fitting 64 connects the second pipe 63 to the first pipe 62, while the pipe fitting 70 connects the first pipe 62 to the filter 42. The safety relief valve 72 is disposed at the upper end of the first pipe 62, and provides a mechanism for pressure release in the system, venting excess fluid pressure in the line. The second pipe 63 extends in a substantially horizontal position between the pump 38 and the first pipe 62, and is connected to the pump 38 by a coupling 65. As liquified hot melt flows out the aperture 30, it is pumped by the pump 38 through the second pipe 63 and the first pipe 62, then into the filter 42 where impurities in the mixture are filtered out. The filter 42 is connected to pipe 74 extending through the aperture 53 to connect with a heated hose 76 by means of a pipe fitting 78. The heated hose 76 provides a conduit by which the liquified hot melt is conveyed to a hot melt application device.

The pump 38 is driven by motor 40 through a shaft 80 passing through the aperture 55 in the melter housing 44. The shaft 80 is driven by the motor 40 through a mechanism consisting of a gearbox 96, a chain 98, a first sprocket 100 and a second sprocket 102. The first sprocket 100 resides in the gearbox 96 of the motor 40 and is rotated by gears within the gearbox 96. This action in turn drives the chain 98 which is connected to the pump 38 by the second sprocket 102, and thus creates a rotational force which drives the shaft 80. Pillow block bearings 90 are provided to stabilize shaft 80. The motor 40 is covered by a motor shroud 82, which also covers a torque limiter 84 and a bearing spacer 86. The torque limiter 84 provides a cap on the amount of torque generated by the motor 40 transmitted to the pump 38, such that the pump 38 will not be forced to work at a rate higher than that allowed by its mechanism. The bearing spacer 86 provides stability to the shaft 80 such that the shaft 80 cannot move in substantially other than a longitudinal direction. A panel mount 88 is present about the interior wall of the motor shroud 82, covering all but the bottom wall 90 of the area in which the motor is enclosed. This bottom wall 90 is covered, like the bottom wall of the housing 44, with the base plate 54 and the base frame 52.

Figure 3:
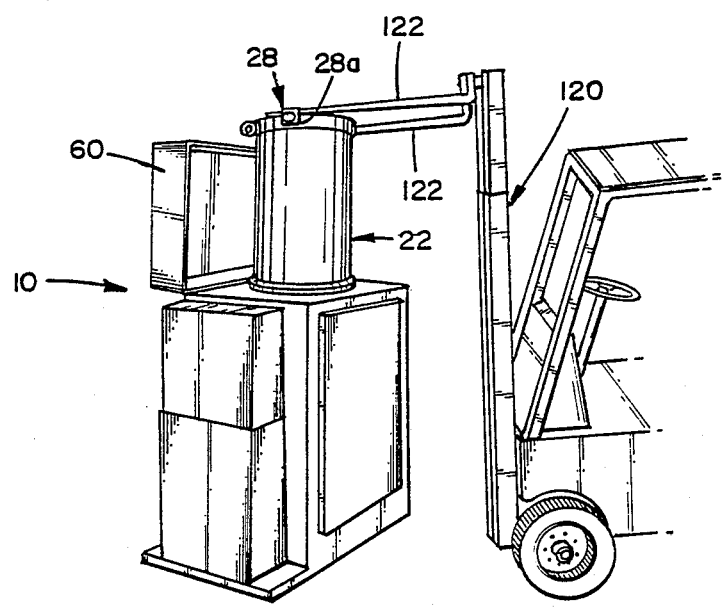
FIG. 3 is perspective view of a drum being loaded into the hot melt dispenser according to the present invention.

In FIG. 1, there is shown a hot melt containing drum 22 suspended for unloading of its hot melt slug content into hopper 21. Drum 22 has fastened around its circumference at one end a drum lifting ring 28 which includes fork lift "handles" 28a and 28b. Ring handles 28a and 28b rests on the top of hopper 21 to suspend the drum 22 for unloading. In FIG. 3, there is shown a perspective view of drum 22 being loaded into dispenser 10. As shown, during the loading process the cover 60 of housing 44 is opened so that drum 22 can be lowered into the position shown in FIG. 1 using a fork lift or other device that can lift and maneuver the drum into place in the hopper. During the loading process the "bottom" or lower end of the drum is removed and the "top" or upper end vented either by removing it or by punching vent holes in it. As shown in FIG. 3, the forks 122 of fork lift 120 are inserted into handles 28a and 28b of ring 28 for lifting of drum 22. Once the drum is positioned in hopper 21, the fork lift is backed away and the cover 60 closed.

Band heaters 32 are then activated to heat the walls (and "bottom" if still in place) of the drum, so that the hot melt slug is released from the drum to slide down onto the top of melting grid 35a. Cover 60 is then re-opened and the drum 22 is pulled out of the hopper 21, leaving the hot melt slug behind. Preferably, the drum is heated sufficiently so that hot melt residue on the sides of the drum flows out into the hopper along with the slug. Once the drum is removed, cover 60 is reclosed and the dispenser is ready to be activated for melting and dispensing operation. In dispensing operation, cartridge heaters 34 in castings 35 are activated to liquify the hot melt deposited in the hopper 20 that it may be pumped to the application devices and used in a hot melt process. The hopper may be reloaded with another slug of hot melt prior to all of the liquified hot melt being dispensed so that continuous non-stop hot melt application is possible.

Based on the characteristics of currently available hot melts band heaters 32 are preferably of sufficient wattage to heat the walls of drum 22 to temperatures in the range of 250 to 475 degrees Farenheit. It shall be understood, however, that the stated range is in no way essential to the invention. Rather, it is only the range presently contemplated to be of greatest utility given known hot melt materials which can be pumped from a hopper-type dispenser. In any event, the temperature to be used for any given hot melt material depends on its various characteristics, but is preferably selected so that the hot melt material is heated sufficiently to be released from the drum container within fifteen to twenty minutes after the band heaters are activated, and so that the hot melt slug is released from the drum before liquified hot melt fills the volume of space below the cartridge heaters and starts backing up around the sides of the drum. Characteristics which affect the rate of melting of a hot melt material from a container include the specific heat and heat of fusion of the hot melt, the filler materials used in the hot melt and the specific heat of the container and the thickness of its walls. Of course, there are various other factors of generally lesser impact that affect the rate of melting of a hot melt material.

In order to facilitate heat transfer to the drum and to encourage release of hot melt from the walls of the hopper they are preferably coated with a black teflon material such as Teflon S (made by Dupont).

The hopper is sized to receive several different sizes of drums in the fifty five gallon range. For example, it will accommodate drums of 22 $\frac{1}{2}''$ and 23 $\frac{1}{2}''$ inside diameters as well as equivalently sized metric system drums. Moreover, the present invention may be used in connection with all presently known drum types, for instance fiber drums or metal drums. In the case of fiber drums, it is preferable to fasten the drum lifting ring to the end of the drum that is in contact with the floor during storage so that the hot melt settled therein provides rigidity to the drum walls to aid in obtaining a secure hold on the drum for lifting. The drum can then be pivoted about the fork handles into an "upside down" position for loading in the hopper.

The present invention may also be used to unload and dispense lesser quantities of slug-form hot melt contained in pails or other containers smaller than drums. Hot melt pails typically have an inside diameter of nineteen to twenty inches and hold five gallons of hot melt. To load a pail of hot melt into the hopper the bottom of the pail is vented, for example, by punching holes in it, and the pail is suspended upside down in the hopper with suitable suspension apparatus and unloaded in the same manner as a drum as described above. Moreover, the hopper 21 may be downsized so that it exclusively accommodates pail quantities of hot melt.

Thus, as described above the present invention provides a unique and advantageous form of hot melt dispenser for use in connection with containers of slug form hot melt. Only a simple and commonly available lifting and loading device such as a forklift is required for unloading a drum container into the dispenser. The process is safe and simple because the hot melt is safely contained in the container in its solid, unheated form until after the container is within the confines of the hopper. Thus, there is no chance that heated hot melt will be inadvertently spilled or splashed during unloading. Due to the high degree of uniformity in heating possible by virtue of the enclosed insulated environment and the placement of the auxillary heating units, the container is emptied relatively completely, leaving little residue remaining therein. Furthermore, the invention makes it possible to use cheaper, less rugged materials to make drum or pail containers because the containers do not have to be pressurized for unloading. The drums can also be made less expensive because there is less need to hold the tolerances required for proper sealing of the platen to the walls of the container as required for proper operation of a drum or pail unloader. Also, the present invention can be used to unload damaged containers not safe for use with an unloader, and can be used to dispense pellet form hot melt as well as slug form hot melt.

It is to be understood that even though numerous characteristics and advantages of the present invention have been set forth in the foregoing description, together with the details of the structure and function of the invention, the disclosure is illustrative only and changes may be made in detail, especially in matters of shape, size and arrangement of parts within the principals of the invention, to the full extent indicated by the broad, general meaning of the terms in which the appended claims are expressed.

It is claimed:

1. A hot melt dispenser for dispensing a solid, unitary mass slug of hot melt from a container wherein said slug adheres to the inside surfaces of said container in its unheated condition, said container open at one end to permit said slug to slide freely out of said container when said slug is released therefrom by the lowering of the adhesion of said slug to the sides of said container, said dispenser comprising:

a hopper sized to receive said container;
 melting means located in the bottom of said hopper for melting hot melt to a liquified pumpable condition;
 support means for supporting said container in said hopper with said open end down and positioned above said melting means with an unobstructed path from slug between said open end and said melting means so that said slug can slide freely out of said container and into contact with said melting means once said slug is released from said container;
 means for pumping liquified hot melt from said hopper; and
 auxiliary heating means for heating the walls of said container when it is supported in said hopper by said support means, said heating means providing that said container is uniformly encircled with a heat sufficient to lower the adhesion of said slug to the inside surfaces of said container to cause said slug to be released from and slide out of said container as a solid unitary mass and into contact with said melting means and further to provide that at the time said slug is released from said container it retains nearly the same shape, dimensions and solid state it possessed in said unheated condition.

2. The dispenser according to claim 1 wherein said heating means comprises heaters located about the circumference of said hopper.

3. The dispenser according to claim 1 or 2 wherein said hopper is contained in a housing and wherein said housing includes insulating for insulating said hopper.

4. The dispenser according to claim 1 or 2 further including a removable cover for selectively covering said hopper, and further wherein said cover is closed when said auxiliary heating means is activated.

5. The dispenser according to claim 3 wherein said housing includes a removable cover for selectively covering said hopper, and further wherein said cover is closed when said heating means is activated.

6. The dispenser according to claim 1 or 2 wherein said heating means includes a thermostat for controlling the heat generated thereby and further wherein said heat generation is selected to heat the walls of said container when supported in said hopper to a temperature sufficient to cause said slug to be released from said container before hot melt melting off said slug fills the bottom of said hopper and backs up and around the outside of said container.

7. The dispenser according to claim 2 wherein said heaters are band heaters.

8. A dispenser according to claim 1 further wherein said support means includes suspension means attached to the upper end of said container as it oriented supported in said hopper and means positioned at the top of said hopper for supporting said suspension means whereby said container is hung from said suspension means in said hopper.

9. A dispenser according to claim 8 further wherein said suspension means comprises a drum lifting ring.

10. A dispenser according to claim 1 wherein said container comprises a drum.

11. A dispenser according to claim 10 further wherein said drum is a fiber drum.

12. A dispenser according to claim 10 further wherein said drum is a metal drum.

13. A dispenser according to claim 1 further wherein the inside walls of said hopper are coated with a black material whereby heat transfer from the walls of said hopper to said container is encouraged.

14. A dispenser according to claim 1 further wherein said heating means can heat the walls of said container to a temperature sufficient to cause said slug to be released from said container within approximately fifteen to twenty minutes of when said heating means is activated.

15. A dispenser according to claim 1 further wherein said heating means heats the walls of said container to a temperature of at least 250 degrees Farenheit.

16. A dispenser according to claim 1 wherein said melting means includes a melting grid and wherein a volume of said hopper is located below said melting grid so that when said slug is released from said container it rests on top of said grid whereby said slug will not splash liquified hot melt in the volume of said hopper underneath said grid.

17. Apparatus according to claim 1 wherein the volume of said hopper underneath said open end of said container suspended in said hopper is less than the volume of said slug.

18. Apparatus according to claim 1 or 17 further wherein the height of said hopper above said melting means is substantially equal to the length of said container and further wherein said container is supported by said means for supporting substantially within said hopper.

19. Apparatus according to claim 1 further wherein said means for supporting said container supports said container with the upper end thereof above the top of said hopper and further including means for enclosing the space above the top end of said container so that heat from said auxiliary heating means is held in the enclosed space.

20. Apparatus according to claim 9 further wherein the handles of said drum lifting ring are positioned above and outside of said hopper whereby they can be readily engaged for the purpose of lifting said container.

21. Apparatus according to claim 1 wherein said support means supports said container at a position in said hopper so that when said slug is released it rests in said hopper with a portion of said slug remaining surrounded by but not adhered to said container.

22. A method for unloading a slug of solid, unitary mass hot melt from a container into a hot melt dispenser hopper, said slug being retained inside said container by adhesion of said slug to the inside surfaces of said container in its unheated condition, said method comprising the steps of:
(a) opening one end of said unheated container to provide that once the adhesion of said slug to said container is sufficiently lowered to release said slug it can slide freely out of said container, and venting the other end of said container;
(b) supporting said opened unheated container in said hopper with the open end of said container down and so that there is an unobstructed path for said slug to come out of said container to permit said slug to slide freely out of said container to the bottom of the hopper when it is released;
(c) uniformly encircling the walls of said unheated container with a heat sufficient to lower the adhesion of said hot melt slug to the inside surfaces of said container so that said slug is released from said container and slides out as a solid unitary mass retaining nearly the same shape, dimensions and solid state as said slug possessed in said unheated condition; and
(d) removing said container from said hopper after said slug is released so that said slug is deposited in said hopper as a solid unitary mass.

23. The method according to claim 22 wherein said walls are heated at a rat sufficient to release said slug from said container before hot melt melted off the surface of said slug backs up in the bottom of said hopper around the outside of said container.

24. The method according to claim 22 or 23 wherein said container comprises a drum and further wherein said method includes the step of fastening a drum lifting ring on said drum and lifting said drum into and out of said hopper from said lifting ring.

25. A method according to claim 22 further wherein said container comprises a drum.

26. A method according to claim 25 further wherein said drum is a fiber drum.

27. A method according to claim 25 further wherein said drum is a metal drum.

28. A method according to claim 22 further wherein the inside walls of said hopper are provided with a coating of a black teflon material to encourage heat transfer from the walls of said hopper to said container.

29. A method according to claim 22 further wherein said method step of heating the walls of said container is accomplished by heating the outside walls of said hopper whereby heat is transferred through said hopper walls to said container.

30. A method according to claim 29 further wherein band heaters are provided to heat the outside walls of said hopper.

31. A method according to claim 22 wherein the walls of said container are heated sufficiently to cause said slug to be released from said container within approximately 15 to 20 minutes of when said heating begins.

32. A method according to claim 22 further wherein said walls of said container are heated to a temperature of at least 250 degrees Farenheit.

33. A method according to claim 22 wherein the bottom of said hopper is provided with melting means including a melting grid and further wherein a volume of said hopper is located below said melting grid so that when said slug is released from said container it rests on top of said grid whereby said slug will not splash liquified hot melt in the volume of said hopper underneath said grid.

34. A method according to claim 22 further wherein there is provided a housing containing said hopper and further wherein there is provided insulation for insulating said housing.

35. A method according to claim 33 further wherein said container is supported in said step (b) over said melting grid so that when said slug is resting on top of said melting grid just after being released from said container a portion of it remains surrounded by but not adhered to said container.

36. A method according to claim 22 further wherein said container is heated to cause hot melt residue adhered to its inside surfaces to melt sufficiently to flow out of said container in approximately the same time taken for said slug to be released from said container so that said container is substantially clean of hot melt residue when said container is removed from said hopper.

37. A method according to claim 22 wherein the volume of said hopper underneath said open end of said container suspended in said hopper is less than the volume of said slug.

38. A method according to claim 22 or 37 further wherein melting means is located in said hopper and the height of said hopper above said melting means is substantially equal to the length of said container, and further wherein said container is supported substantially within said hopper.

39. A method according to claim 22 wherein said other end is vented by opening it completely.

* * * * *

UNITED STATES PATENT AND TRADEMARK OFFICE
CERTIFICATE OF CORRECTION

PATENT NO. : 4,919,308

DATED : April 24, 1990

INVENTOR(S) : Gerald A. Majkrzak

It is certified that error appears in the above-identified patent and that said Letters Patent is hereby corrected as shown below:

Col. 3, line 48 change "uloading" to --unloading--

Col. 9, line 61 change "rat" to --rate--

Signed and Sealed this

Sixth Day of August, 1991

Attest:

HARRY F. MANBECK, JR.

*Attesting Officer*  *Commissioner of Patents and Trademarks*